Dec. 24, 1946. H. H. HOLLY 2,413,046
HAMBURGER PATTY MAKER
Filed May 1, 1944 5 Sheets-Sheet 1

HARRY H. HOLLY
INVENTOR
per
ATTORNEY

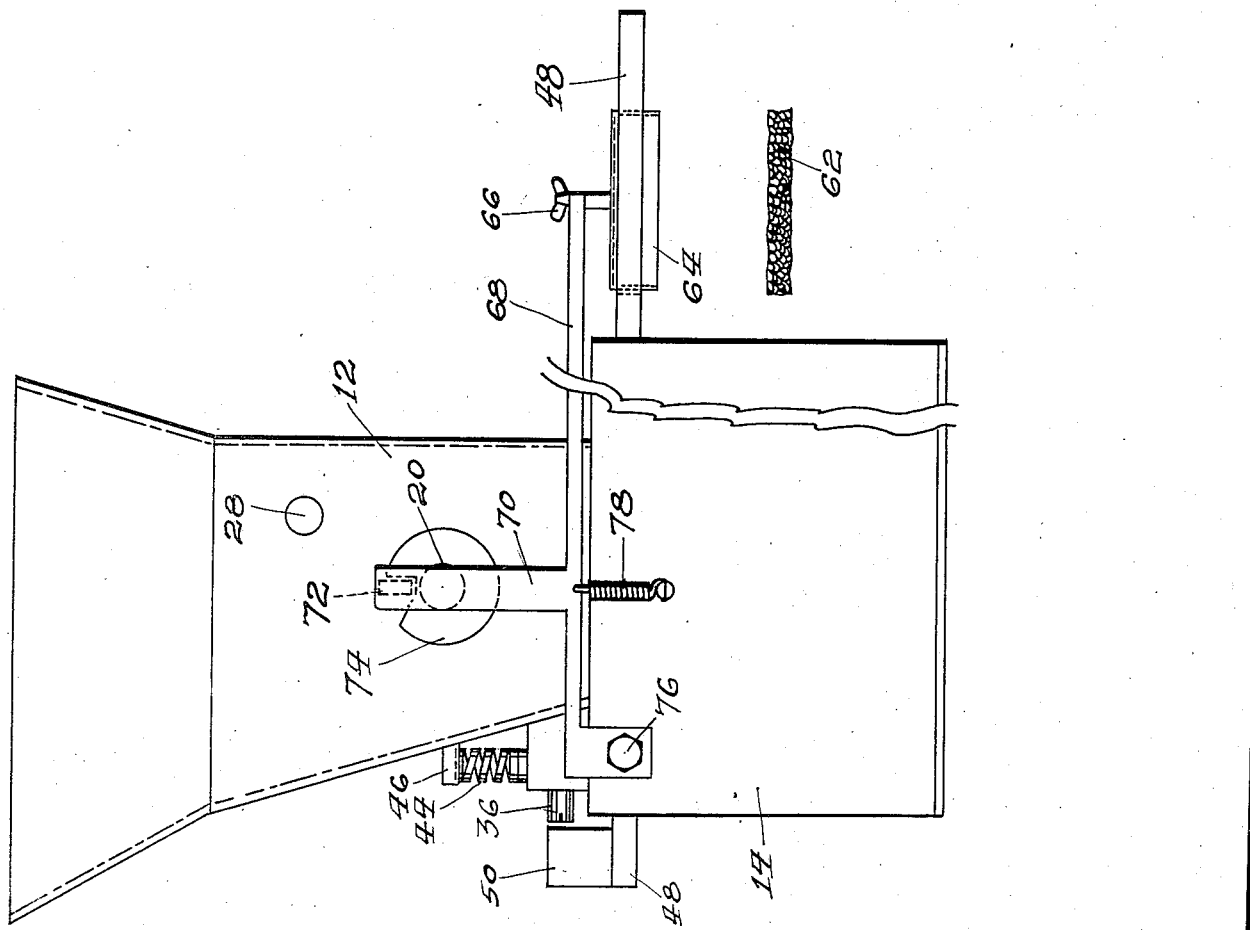

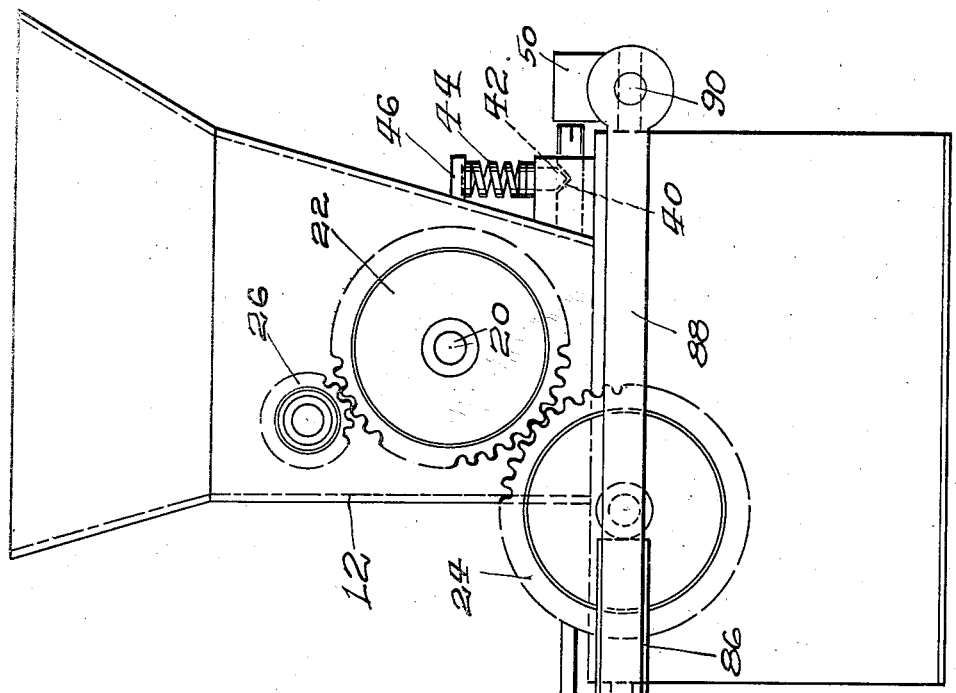
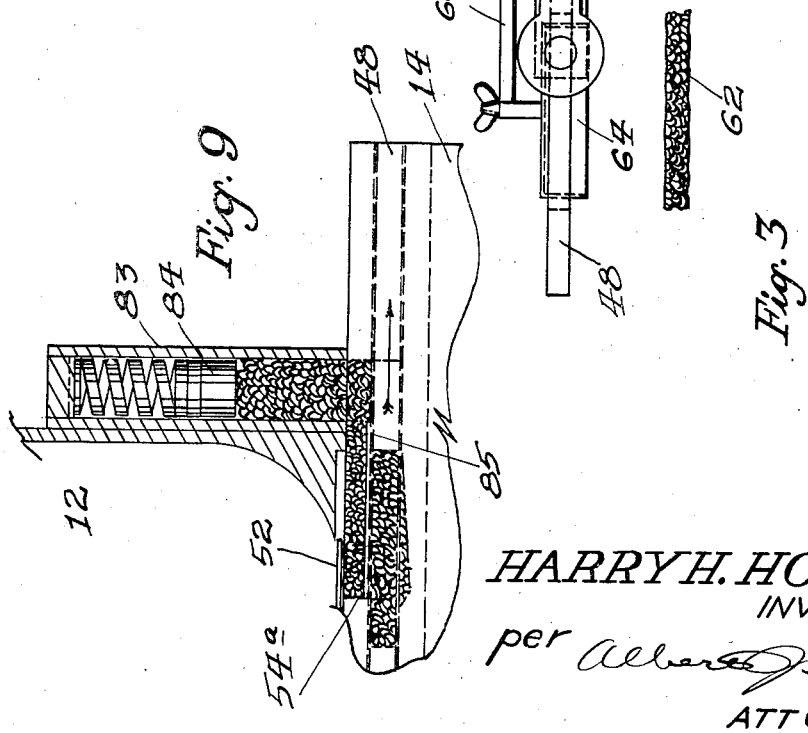

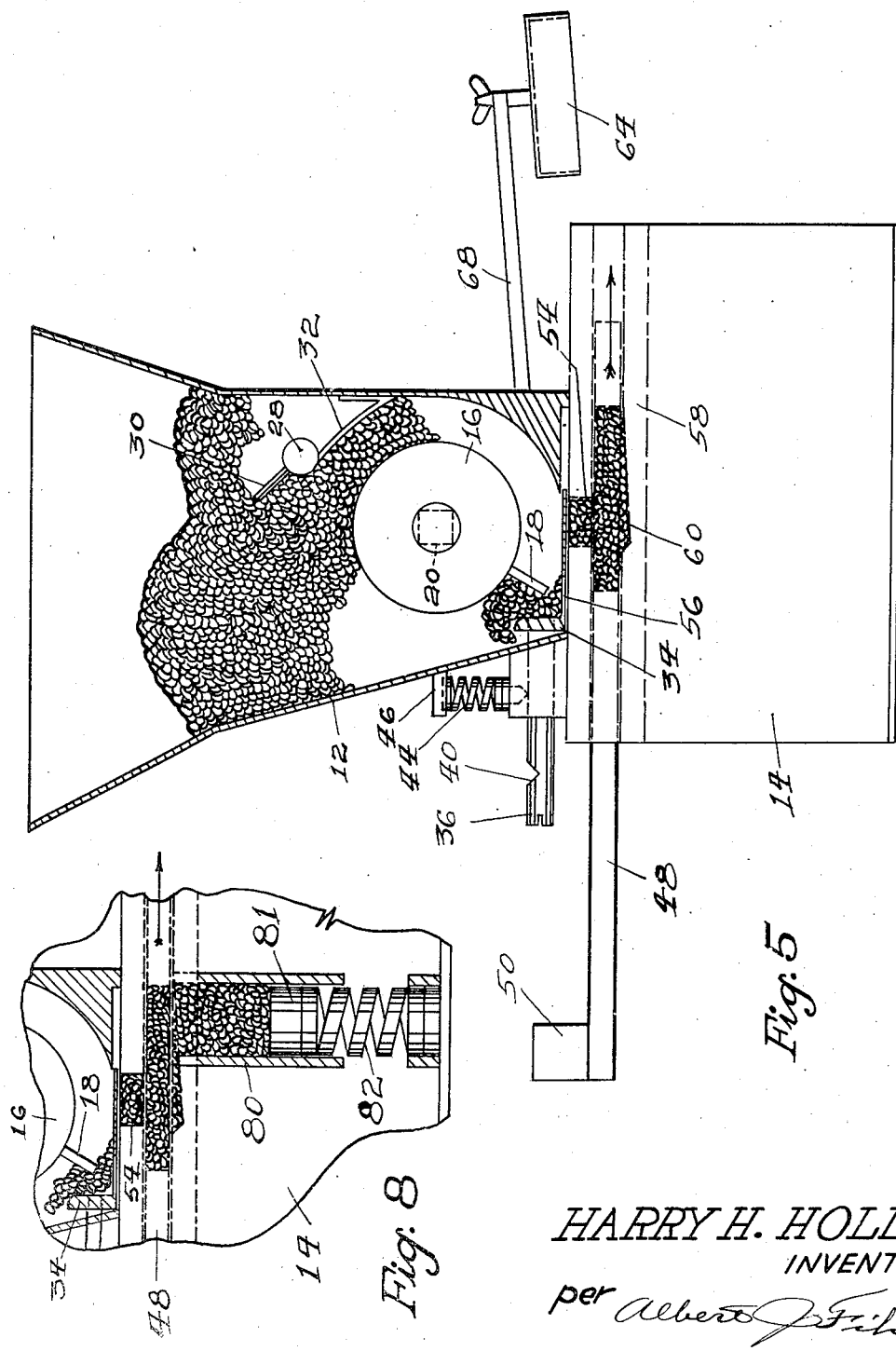

Dec. 24, 1946.                H. H. HOLLY                 2,413,046
                        HAMBURGER PATTY MAKER
                        Filed May 1, 1944           5 Sheets-Sheet 5
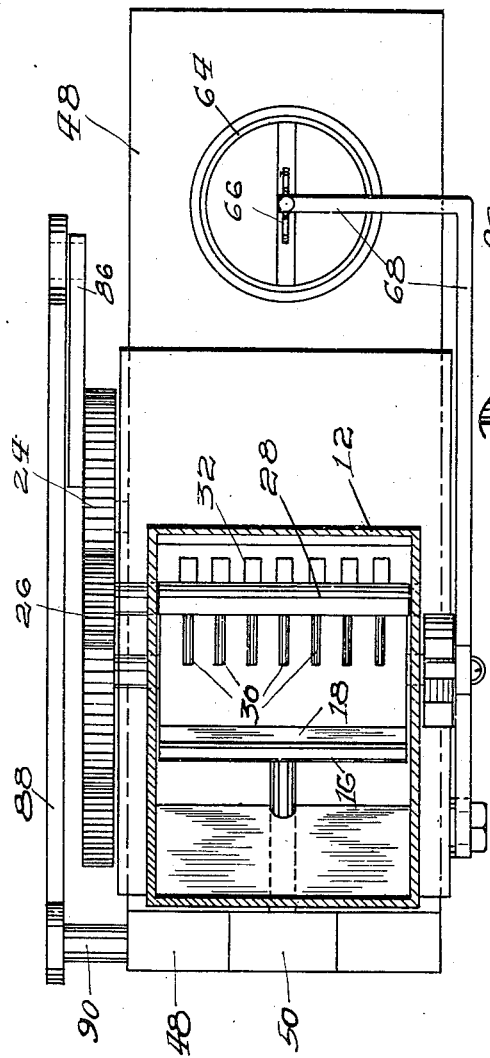
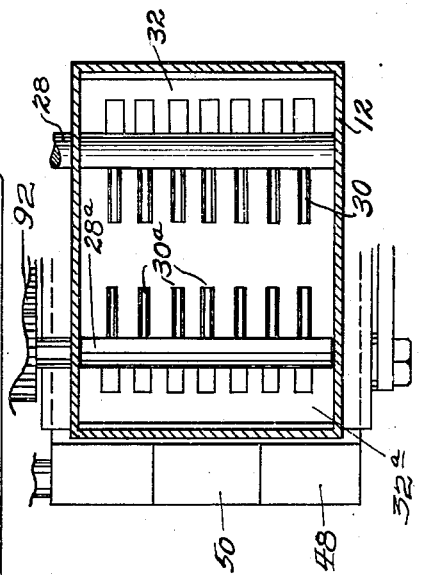
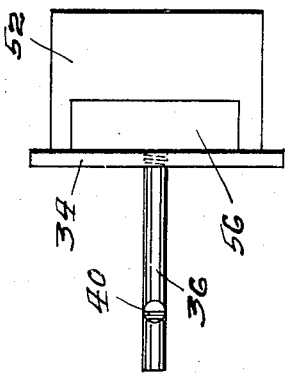
HARRY H. HOLLY
INVENTOR
per
ATTORNEY Patented Dec. 24, 1946

2,413,046

UNITED STATES PATENT OFFICE 2,413,046

HAMBURGER PATTY MAKER

Harry H. Holly, Chicago, Ill., assignor to Holly Molding Devices, Chicago, Ill., a partnership Application May 1, 1944, Serial No. 533,587

25 Claims. (Cl. 17—32)

This invention relates to an improved hamburger patty maker, and the present application discloses improvements over my previously patented inventions along this same line, as follows: "Molding device," dated May 25, 1937, No. 2,081,455; "Patty molding machine," dated December 10, 1940, No. 2,224,390; "Patty makers," dated October 28, 1941, No. 2,260,780; "Portioning mechanism," dated November 17, 1942, No. 2,302,651; "Automatic portioning and molding mechanism," dated January 11, 1944, No. 2,338,939.

This application further constitutes an improvement over my invention entitled "Feed and measuring means for plastic material," application for patent on which was filed July 9, 1943, Serial No. 493,997.

The primary object of the present invention is the efficient production of ground meat patties for use in hamburgers wherein each patty is accurately shaped so far as dimensions and weight are concerned, and is immediately ready for cooking on a grill or can alternatively be packaged for storage and later use.

One of the important objects of this invention is to provide a hamburger patty maker, either hand-operated or motor driven, wherein a comparatively large quantity of ground meat can be placed in a hopper, from whence it is positively fed to a mold which is of predetermined shape and size, from which mold the completed patty is automatically ejected for further disposition.

Another important object of the invention is to provide in a hamburger patty maker means for insuring a full weight patty in each and every operation, while at the same time eliminating the use of undue pressure on the meat itself, it having been found that excess pressure is harmful to the meat and to the completed hamburger in that valuable and nutritious meat juices are thereby undesirably extracted and wasted.

Other and further important objects of the invention will be apparent from the disclosures in the accompanying drawings and following specification.

The invention, in a preferred form, is hereinafter more fully described.

In the drawings:

Figure 2 is also a side elevation of the device illustrated in Figure 1, depicting the exterior construction and particularly the arrangement of the apparatus whereby the completed patty is ejected from the mold or slide plate.

Figure 3 is an elevation of the apparatus of this invention, showing same as viewed from the side opposite to that shown in Figures 1 and 2.

Figure 5 is a side view of the device, parts being broken away to show interior construction, and illustrating the movable elements in a position slightly subsequent to the position of the corresponding parts shown in Figure 1.

Figure 6 is a detailed view of a portion of the meat compressing and holding means.

Figure 7 is a top plan view of the apparatus, showing the same in the position illustrated in Figure 2.

Figure 8 is a detailed view of a modified form of the invention, which can be used in connection with the structure shown in the preceding figures.

Figure 9 shows a further embodiment of the modification illustrated in Figure 8.

Figure 10 is a detailed view, parts being broken away, showing a further feed means which can be employed with the machine, if desired.

As shown in the drawings:

Figures 1, 4:
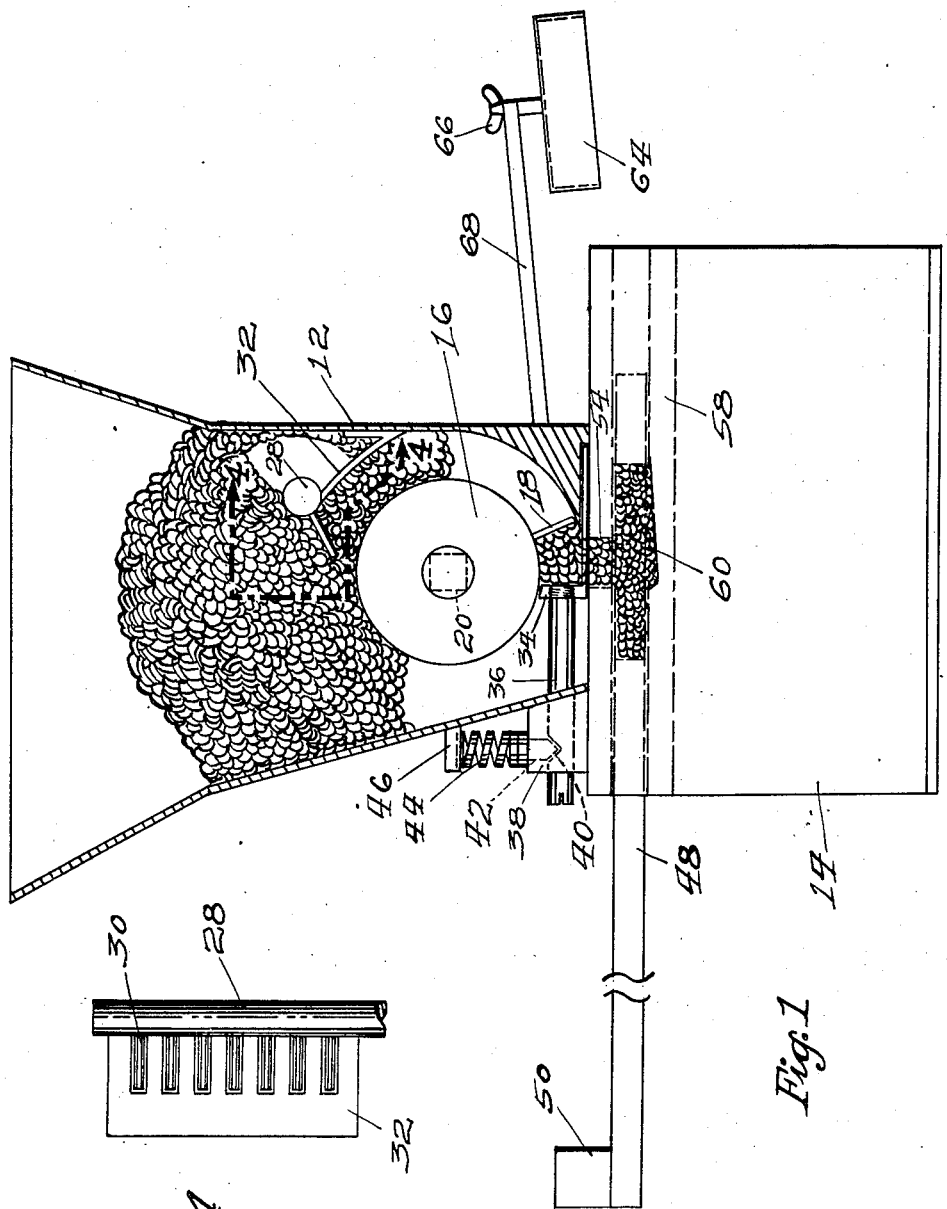
Figure 1 is a side elevation, partly in section, of the improved hamburger patty maker of this invention, showing in some detail the actual operation of molding a meat patty.
Figure 4 is a detailed view taken from the line 4—4 of Figure 1 and looking in the direction indicated by the arrows.

The reference numeral 12 indicates generally a hopper which forms an essential part of the apparatus of this invention, and which hopper is mounted on a supporting base 14. The hopper may be removably mounted, if desired.

Rotatably mounted in the hopper and positioned transversely thereof is a meat feeding cylinder 16, which has fixedly and radially mounted in its periphery a pusher vane 18. This cylinder 16 is mounted on a shaft 20 squared at one end, as shown in Figures 1 and 5, and which shaft is rotatably mounted in suitable bearings in the sides of the hopper 12.

A gear 22 is mounted on the shaft 20 outside the hopper, and this gear is in mesh with two other gears 24 and 26, as best shown in Figures 3 and 7.

The gear 26 is mounted on a shaft 28, which also extends transversely of the hopper and into which, on the inside of the hopper, is fixed a series of radially extending prongs 30. The gears 22 and 26 preferably have a four to one ratio so that the shaft 28 with its prongs 30 will rotate four times while the shaft 20 with its drum 16 rotates once.

A comb-like device 32 is provided fixed in one end of the hopper, as best shown in Figures 1, 4, 5 and 7, whereby any meat which might have a tendency to stick to the prongs 30 is stripped therefrom as the shaft 28 is rotated, and forced into the space between the comb 32 and the periphery of the cylinder 16, all as best shown in Figures 1 and 5.

This meat is then pushed by the vane 18 downwardly into the positions shown in Figure 1, where it is trapped between the vane and the outermost face of a meat-compressing and holding element 34, which operates between the periphery of the cylinder 16 and the bottom of the hopper 12. This element 34 is removably mounted on the end of a shaft 36, which passes through one face of the hopper and projects beyond the same through a bearing 38. The shaft 36 is notched, as best shown by the dotted lines 40, and into this notch is fitted the correspondingly shaped end of a locking pin 42, which is held in position in the notch by means of the helical spring 44, the helical spring being maintained in the desired position beneath a holding ledge 46.

Owing to the nature of ground meat, the amount of same which will be forced into the space between the comb 32 and the surface of the cylinder 16 will inevitably vary and the amount caught by the vane 18 and pushed down between it and the corresponding inner face of the hopper 12 will likewise be variable. However, it is of course necessary that the same amount of meat will eventually be delivered in the shape of each patty. This is determined by an opening in a reciprocating plate 48, which slides in a space provided therefor in the base 14.

As shown in Figures 1 and 5, the meat forced down by the vane 18 passes through an opening in the bottom of the hopper and into the opening in the slide plate 48 when the slide plate is in retracted position. As soon as this opening in the slide plate is filled, pressure is built up against the element 34, as there is always an excess of meat over and above the amount which is to comprise the completed patty. Continued rotation of the cylinder 16 and the corresponding pressure of the vane 18 against the excess meat will eventually force the element 34 and its shaft 36 rearwardly against the downward pressure of the pin 42 in the notch 40, and these elements will then assume the position shown in Figure 5, whereby excess meat is simply carried around by the vane 18 for a further feeding operation.

Retraction of the shaft 36 is assured even though a minimum amount of excess meat is left after the vane 18 has completed the operation of filling the hole in the slide plate 48 because the relative dimensions of the vane 18 and the element 34 on the shaft 36 are such that the vane itself will contact the plate 34 in the normal rotation of the cylinder 16, thereby forcing the pin 42 out of the notch 40.

A projection 50 is fixed on the rear end of the slide plate 48 in such a position that when the slide plate moves forwardly, the projection 50 contacts the retracted end of the shaft 36 and pushes it back into original position with the pin 42 again in place in the notch 40, all as best shown in Figures 2 and 3.

The rear end of the shaft 36 is slotted so that a screw driver or other tool can be used to disassemble this shaft from the plate 34 when the apparatus is to be taken apart for cleaning.

Integral with the plate 34 and at right angles thereto is a locking plate 52, which moves over an opening 54 in the top of the cabinet 14, and which opening communicates with the opening in the slide plate 48 when the slide plate is in retracted position, as best shown in Figures 1 and 5.

The plate 52 has an opening 56 therein, which opening is adjacent the element 34, whereby when the apparatus is in the position shown in Figure 1, the meat can readily pass from the space between the vane 18 and the plate 34 through the openings 54 and 56 and into the hole in the slide plate 48. When the hole in the slide plate has been filled and the vane 18 and plate 34 have assumed the position shown in Figure 5, the opening 56 in the plate 52 has moved beyond the opening 54 in the top of the cabinet 14, thereby locking or trapping the meat in the hole in the slide plate 48 and preventing any back pressure from allowing the meat to move out of the hole, which would then of course result in an undersized patty.

It will be noted that the plate 58 which is in the cabinet 14 and beneath the slide plate 48, has a wedge-shaped depression 60 in its top face adjacent the position of maximum retraction of the opening in the slide plate 48. This is for the purpose of assisting to wedge the portion of ground meat into the opening in the slide plate 48 when the same is again moved forwardly, as indicated by the arrow in Figure 5. This wedge-shaped depression is not necessary with all kinds of meat and can be dispensed with in many cases.

After the opening in the slide plate 48 has been filled and the slide plate moved to its outermost position, as shown in Figures 2 and 3, the completed patty 62 is ejected from the opening in the slide plate 48 by means of a knock-out element, which includes a ring 64 connected by means of a winged nut or the like 66 to the end of a supporting arm 68.

As best shown in Figure 2, this supporting arm 68 has integral therewith an upright extension 70 which is parallel to one side of the hopper, and which has fixed on its rear face a lug or projection 72. This projection rides on a cam 74 which is mounted on and rotated by the shaft 20, and the cam 74 is so shaped that at one part of its revolution the lug 72 drops into a depression in the cam 74, thereby allowing the knock-out assembly to move downwardly and eject the completed patty 62 from the opening in the slide plate 48. The knock-out assembly is pivoted on the casing 14 at 76 and a spring 78 assures of the desired downward motion for patty-ejecting purposes.

In order to further assure the positive filling of the opening in the slide plate 48, a cylinder 80 may be positioned in the cabinet 14 adjacent the opening 54 in the top of the cabinet, and this cylinder has therein a piston 81 which is normally impelled upwardly by a spring 82. In this arrangement excess meat is forced into the cylinder 80 against the upward pressure of the piston 81 before the pressure on the excess meat by the vane 18 forces the element 34 rearwardly. This assures of a reserve supply of meat at all times, and when the slide plate 48 is again moved into its retracted position, the pressure of the piston 81 against the reserve meat in the cylinder 80 acts to first fill the opening in the slide plate 48, at least to some extent, and the movement of the vane 18 completes this filling operation. In this way there is practically never any possibility of an undersized patty. This arrangement is illustrated in Figure 8.

In Figure 9, a further modification of this safety filling element is illustrated, wherein a cylinder 83 is positioned adjacent the forward face of the hopper 12 and an elongated opening 54a is made in the top late of the cabinet 14, whereby communication from the hopper to the interior of the cylinder 83 will result. A spring-pressed piston 84 is mounted in the cylinder 83 and a plate 85 is built into the lower part of the opening 54a, this plate extending to a position in line with the forward edge of the hopper 12 or the read edge of the cylinder 83, all as best shown in Figure 9. In this construction meat is forced from the hopper 12 in the usual manner and first enters the cylinder 83, after which the retracting movement of the slide plate 48 brings the opening therein into line with the opening directly beneath the cylinder 83, this opening being outlined on one side by the forward edge of the plate 85. The locking plate 52 being at that time in position to lock the entrance from the hopper, the action of the piston 84 forces the meat into the opening in the slide plate 48, and the capacity of the cylinder 83 is such that there is always an excess of meat over and above the size of the opening in the slide plate 48, whereby a full patty is again always assured.

The slide plate is reciprocated by means of a crank arm 86 which is fixed to the gear 24 and rotates therewith. The end of this crank arm 86 is pivotally connected with a connecting rod 88, which connecting rod has its rear end pivotally connected at 90 to the slide plate 48. This connecting rod construction can be duplicated on the other side of the machine if such is considered desirable or necessary.

The preliminary feed element 28—30 may also be duplicated for better feeding action, as shown in Figure 10, where a second shaft 28a is mounted in the rear portion of the hopper and a series of pins 30a are fixed in the shaft 28a, which pins operate through slots in a comb 32a. This shaft 28a is driven by a further gear 92 which is in mesh with the gear 26, which drives the shaft 28. Thus, the shafts 28 and 28a rotate in opposite directions, forcing the meat downwardly through the middle of the hopper and onto the cylinder 16.

The machine is preferably motor driven, but can be operated by hand, if necessary. The completed patties may be delivered direct to the grill for cooking or may be deposited on individual sheets of waxed paper for storage until needed.

I am aware that many changes may be made and numerous details of construction varied throughout a wide range without departing from the principles of this invention, and I, therefore, do not propose limiting the patent granted hereon otherwise than as necessitated by the prior art.

I claim as my invention:

1. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means separate from but co-operating with the main feeding element for maintaining pressure on the meat until the opening in the slide plate is filled.

2. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the main feeding element to pass from the hopper into the opening in the slide plate, and means for applying additional pressure to the meat until the opening in the slide plate is filled, said last means comprising a retractable plate mounted adjacent the main feeding element.

3. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, the main feeding element comprising a cylinder rotatably mounted in the hopper and a radial vane fixedly mounted in the cylinder and projecting beyond the periphery thereof.

4. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, the main feeding element comprising a cylinder rotatably mounted in the hopper and a vane fixedly mounted in the cylinder and projecting beyond the periphery thereof, said vane being of a length sufficient to contact one face of the hopper through approximately one-fourth of its revolution.

5. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, the preliminary feeding element comprising a horizontal shaft rotatably mounted in the hopper and a row of pins fixed in the shaft.

6. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, the preliminary feeding element comprising a shaft rotatably mounted in the hopper and a series of pins fixed in the shaft, said pins being in alignment, and a stripping comb fixed in the hopper for co-operation with the pins.

7. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, the preliminary feeding element comprising a shaft rotatably mounted in the hopper and a series of pins fixed in the shaft, said pins being in alignment, and a stripping comb fixed in the hopper for co-operation with the pins, said preliminary feeding element including a duplicate pair of shafts, pins and combs.

8. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, said last means comprising a retractable plate mounted adjacent the main feeding element, a shaft projecting rearwardly from the plate and out through the rear face of the hopper, and means for releasably maintaining the plate and shaft in forward position.

9. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, means for maintaining pressure on the meat until the opening in the slide plate is filled, said last means comprising a retractable plate mounted adjacent the main feeding element, a shaft projecting rearwardly from the plate and out through the rear face of the hopper, and means for releasably maintaining the plate and shaft in forward position, said last means comprising a spring-pressed pin mounted adjacent the rear face of the hopper, with its lower end adapted to co-operate with a notch in the shaft.

10. A hamburger patty maker comprising a hopper for ground meat, a preliminary feeding element in the hopper, a main feeding element comprising a vaned cylinder also in the hopper adjacent the preliminary feeding element, a slide plate having an opening therein reciprocatively mounted below the hopper, means for allowing meat under pressure to pass from the hopper into the opening in the slide plate, means for maintaining pressure on the meat until the opening in the slide plate is filled, said last means comprising a retractable plate mounted adjacent the main feeding element, a shaft projecting rearwardly from the plate and out through the rear face of the hopper, means for releasably maintaining the plate and shaft in forward position, said last means comprising a spring-pressed pin mounted adjacent the rear face of the hopper, with its lower end adapted to co-operate with a notch in the shaft, the tension of the spring being such that the shaft and plate will be suddenly released for rearward movement upon the building up of a predetermined excess pressure between the cylinder vane and the plate on the shaft.

11. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, said last means comprising a retractable plate mounted adjacent the main feeding element, a shaft projecting rearwardly from the plate and out through the rear face of the hopper, and means for releasably maintaining the plate and shaft in forward position, said last means comprising a spring-pressed pin mounted adjacent the rear face of the hopper, with its lower end adapted to co-operate with a notch in the shaft, a horizontally extending plate fixed to the first named plate, said horizontally extending plate adapted to move into and out of position over the opening in the slide plate.

12. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, said last means comprising a retractable plate mounted adjacent the main feeding element, a shaft projecting rearwardly from the plate and out through the rear face of the hopper, and means for releasably maintaining the plate and shaft in forward position, said last means comprising a spring-pressed pin mounted adjacent the rear face of the hopper, with its lower end adapted to co-operate with a notch in the shaft, a horizontally extending plate fixed to the first named plate, said horizontally extending plate adapted to move into and out of position over the opening in the slide plate, said horizontally extending plate also having an opening therein, whereby meat is allowed to pass from the hopper into the opening in the slide plate when the shaft-supported plate is in one position and whereby meat is locked in said opening in the slide plate when the shaft-supported plate is in retracted position.

13. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, and further means for wedging the meat in the opening in the slide plate into a more compact mass when the slide plate is reciprocated.

14. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, together with additional means for maintaining a reserve supply of meat under pressure, said additional means comprising a piston and cylinder connecting with the opening in the slide plate.

15. A hamburger patty maker comprising a hopper for ground meat, a preliminary feeding element in the hopper, a slide plate having an opening therein reciprocatively mounted below the hopper, a main feed element in the hopper for forcing meat under pressure from the hopper into the opening in the slide plate, and spring controlled means for maintaining pressure on the meat until the opening in the slide plate is filled.

16. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, and additional means for maintaining a reserve supply of meat under pressure, said additional means connecting with the opening in the slide plate, and including a cylinder and a spring-pressed piston operating in the cylinder.

17. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, and additional means for maintaining a reserve supply of meat under pressure, said additional means connecting with the opening in the slide plate, and including a cylinder and a spring-pressed piston operating in the cylinder, and means for allowing meat to move in one direction only from the hopper to the opening in the slide plate.

18. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, and additional means for maintaining a reserve supply of meat under pressure, said additional means connecting with the opening in the slide plate, and including a cylinder and a spring-pressed piston operating in the cylinder, and means for allowing meat to move in one direction only from the hopper to the opening in the slide plate and to the cylinder for reserve meat.

19. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, and additional means for maintaining a reserve supply of meat under pressure, said additional means connecting with the opening in the slide plate, and including a cylinder and a spring-pressed piston operating in the cylinder, and means for allowing meat to move in one direction only from the hopper to the opening in the slide plate and to the cylinder for reserve meat, the cylinder for reserve meat being positioned beneath the slide plate.

20. A hamburger patty maker comprising a hopper for ground meat, a preliminary feeding element in the hopper, a main feeding element also in the hopper adjacent the preliminary feeding element, a slide plate having an opening therein reciprocatively mounted below the hopper, means for allowing meat under pressure to pass from the hopper into the opening in the slide plate, and means for maintaining pressure on the meat until the opening in the slide plate is filled, and additional means for maintaining a reserve supply of meat under pressure, said additional means connecting with the opening in the slide plate, and including a cylinder and a spring-pressed piston operating in the cylinder, and means for allowing meat to move in one direction only from the hopper to the opening in the slide plate and to the cylinder for reserve meat, the cylinder for reserve meat being positioned above the slide plate and adjacent the hopper.

21. A hamburger patty maker including a hopper for ground meat, meat feeding means in the hopper, an opening in the bottom of the hopper, a slide plate having an opening therein reciprocatively mounted beneath the hopper and with its opening adapted to intermittently connect with the opening in the bottom of the hopper, and a spring controlled pressure means also in the hopper co-operating with the feed means to maintain meat under pressure during a part of each reciprocatory movement of the slide plate until the opening in the slide plate is filled with meat.

22. A hamburger patty maker including a hopper for ground meat, meat feeding means in the hopper, an opening in the bottom of the hopper, a slide plate having an opening therein reciprocatively mounted beneath the hopper and with its opening adapted to intermittently connect with the opening in the bottom of the hopper, and a spring controlled pressure means also in the hopper co-operating with the feed means to maintain meat under pressure during a part of each reciprocatory movement of the slide plate until the opening in the slide plate is filled with meat, and means for removing the packed meat from the slide plate opening during a portion of each reciprocatory movement of the slide plate.

23. A hamburger patty maker including a hopper for ground meat, meat feeding means in the hopper, an opening in the bottom of the hopper, a slide plate having an opening therein reciprocatively mounted beneath the hopper and with its opening adapted to intermittently connect with the opening in the bottom of the hopper, and a spring controlled pressure means also in the hopper co-operating with the feed means to maintain meat under pressure during a part of each reciprocatory movement of the slide plate until the opening in the slide plate is filled with meat, and means for removing the packed meat from the slide plate opening during a portion of each reciprocatory movement of the slide plate, said means including a knock-out ring of a slightly smaller diameter than the diameter of the opening in the slide plate.

24. A hamburger patty maker including a hopper for ground meat, meat feeding means in the hopper, an opening in the bottom of the hopper, a slide plate having an opening therein reciprocatively mounted beneath the hopper and with its opening adapted to intermittently connect with the opening in the bottom of the hopper, and a spring controlled pressure means also in the hopper co-operating with the feed means to maintain meat under pressure during a part of each reciprocatory movement of the slide plate until the opening in the slide plate is filled with meat and to maintain pressure on the meat until the opening in the slide plate has moved away from the opening in the bottom of the hopper.

25. A hamburger patty maker including a hopper for ground meat, meat feeding means in the hopper, an opening in the bottom of the hopper, a slide plate having an opening therein reciprocatively mounted beneath the hopper and with its opening adapted to intermittently connect with the opening in the bottom of the hopper, and a spring controlled pressure means also in the hopper co-operating with the feed means to maintain meat under pressure during a part of each reciprocatory movement of the slide plate until the opening in the slide plate is filled with meat, and means for removing the packed meat from the slide plate opening during a portion of each reciprocatory movement of the slide plate, said means including a knock-out ring of a slightly smaller diameter than the diameter of the opening in the slide plate, and means for automatically forcing the knock-out ring downwardly through the opening in the slide plate at one extremity of its movement.

HARRY H. HOLLY.